No. 877,438. PATENTED JAN. 21, 1908.
J. W. LAMBERT.
FRICTION DRIVING MECHANISM FOR AUTOMOBILES.
APPLICATION FILED DEC. 13, 1906. RENEWED SEPT. 6, 1907.
2 SHEETS—SHEET 2.
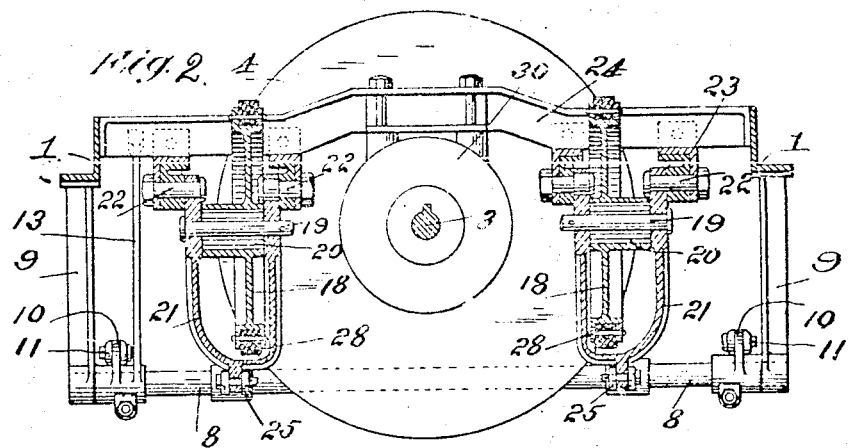
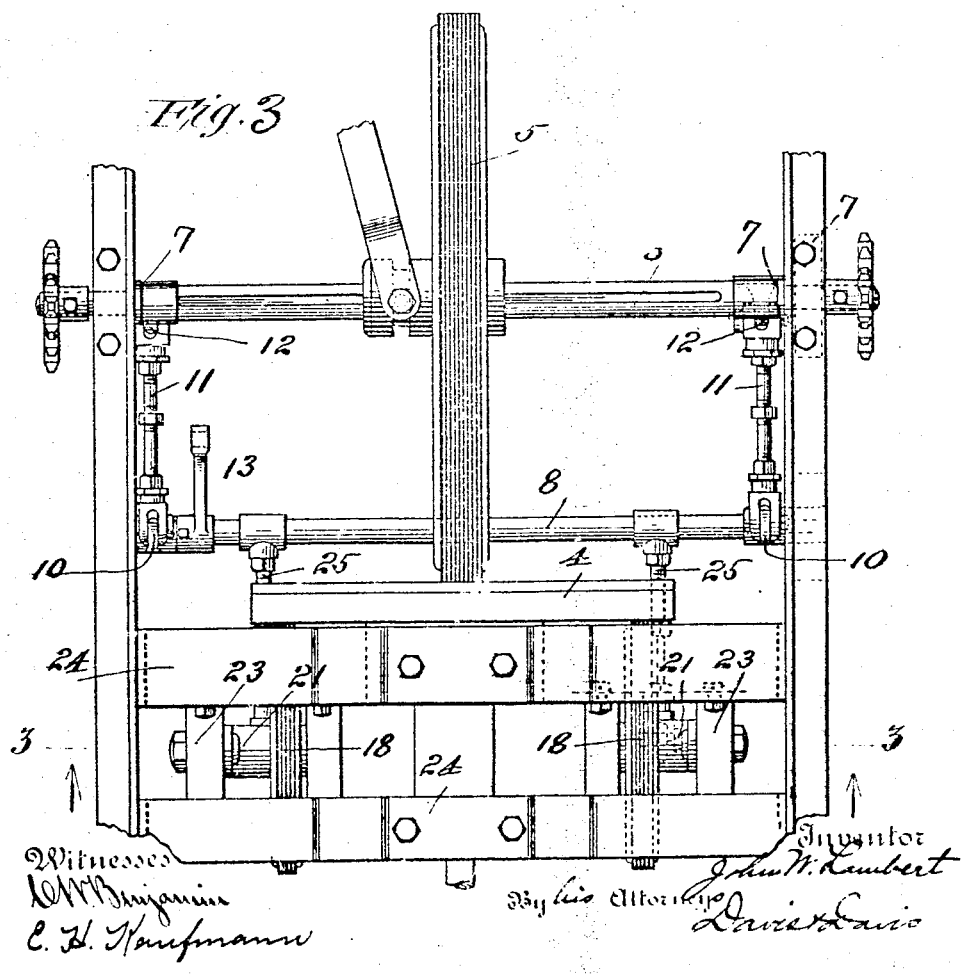

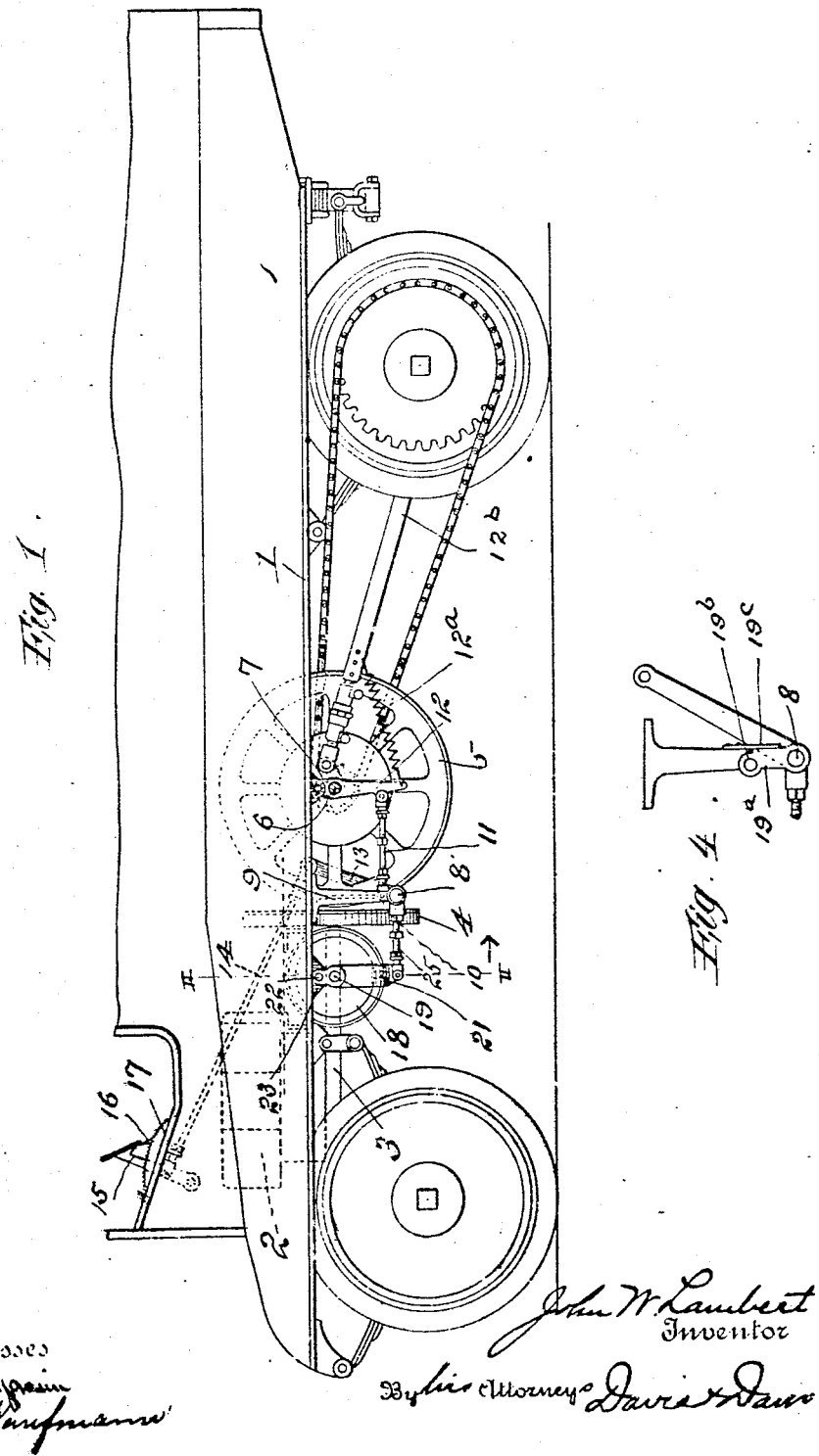

UNITED STATES PATENT OFFICE.

JOHN W. LAMBERT, OF ANDERSON, INDIANA.

FRICTION DRIVING MECHANISM FOR AUTOMOBILES.

No. 877,438.　　　　Specification of Letters Patent.　　　Patented Jan. 21, 1908.

Application filed December 13, 1906. Serial No. 347,601. Renewed September 6, 1907. Serial No. 391,702.

*To all whom it may concern:*

Be it known that I, JOHN W. LAMBERT, a citizen of the United States, residing at Anderson, county of Madison, State of Indiana, have invented certain new and useful Improvements in Friction Driving Mechanism for Automobiles, of which the following is a specification, reference being had therein to the accompanying drawings, in which—

Figure 1 is a side elevation of a truck provided with my invention; Fig. 2 a transverse sectional view on the line II—II of Fig. 1; and Fig. 3 a plan view. Fig. 4, is a detail side elevation of a form of hanger for the rock shaft 8.

This invention relates to improvements in that form of friction drive for automobiles known as the "Lambert drive," wherein a disk is rigidly secured to the engine shaft and a driven disk is brought into contact with the face of said friction disk, power being transmitted from said driven disk to the rear axle by any suitable means. When this friction drive is applied to heavy trucks the driven disk must be forced against the friction disk with considerable pressure, and it is one of the objects of this invention to provide means by which the thrust of the driven disk against the friction disk may be taken up, thereby preventing any tendency to displace the friction disk from its true perpendicular with respect to the engine shaft.

Another object of the invention is to provide means for simultaneously bringing the driven disk against the friction disk and a freely rotatable thrust receiving wheel against the opposite side of the friction disk.

Other objects of the invention, relating more particularly to details of construction, will more fully hereinafter appear and will be particularly pointed out in the claims.

Referring to the various parts by numerals, 1 designates the frame of a truck in which may be mounted an engine 2 of any suitable form. On the shaft 3 of the engine is mounted the friction disk 4, the shaft being arranged longitudinally of the truck and the disk being perpendicular to the shaft. The driven disk 5 is mounted on a tranverse shaft 6. This shaft is supported by pivoted hangers 7 said hangers being suspended from the truck frame.

In the rear of the friction disk a rock shaft 8 is mounted in hangers 9 which are suspended from the truck frame. Mounted rigidly on this rock shaft are arms 10, said arms being connected by adjustable rods 11 to depending arms 12 connected to the hangers 7 supporting the shaft 6. Rigidly secured to the rock-shaft 8 is an upward and rearwardly extending crank arm 13 the upper end of said arm being connected by rod 14 to a pivoted foot-lever 15 secured in the forward end of the truck frame. This foot-lever is provided with a pawl 16 adapted to engage a ratchet segment 17 to hold the lever in its adjusted positions. By forcing the foot-lever forward the shaft 8 is rotated in its bearings and the driven disk is swung forward against the rear face of the friction disk. Power is transmitted from the shaft 6 to the rear axle of the truck by any suitable means.

Suitable mechanism is usually employed for shifting the driven disk on the friction disk in order to vary the speed of the shaft 6 and to reverse its motion, but I do not consider it necessary to show this mechanism in this application.

To take up the forward thrust of the driven disk on the friction disk, two freely rotating thrust wheels 18 are mounted forward of the friction disk and in position to be brought to bear on the forward side of said disk. Each of these thrust wheels is mounted on a short shaft 19, said shaft being provided with roller bearings 20. Each shaft 19 is supported in a depending swinging yoke 21, near the upper end thereof. The upper ends of the vertical arms of this yoke are pivotally supported by horizontal pins 22 secured in depending brackets 23. These brackets are rigidly secured to cross-bars 24 of the main frame 1. The thrust wheels are so mounted that the centers of said wheels will be in a horizontal plane passing through the center of the friction disk; and said disks are adapted to be brought to bear against the forward face of the friction disk at a point near the periphery thereof, said points of contact being in the same horizontal plane with the center of the friction disk. By this means the friction disk will be sufficiently "backed up" to permit it to take the forward thrust of the driven disk without the least distortion. The lower ends of the suspended yokes are connected to the rock-shaft 8 by means of adjustable bars 25. The hangers 9 carrying the rock-shaft 8 are so made that they may be slightly sprung rearward when the driven disk is forced against the friction disk. It will thus be seen that by throwing back the foot lever to rock the shaft 8 and force the driven disk against the friction disk the hangers will be sprung rearward and the yokes 21 will be drawn rearward sufficiently to bring the thrust wheels into contact with the forward face of the friction disk. It will be understood that it is only necessary to bring the thrust wheels into contact with the friction disk, and it is not desirable that said wheels should be forced against the friction disk with any degree of pressure. I may provide any suitable means for permitting this slight rearward movement of the thrust wheels. It is also desirable that the thrust wheels may move forward away from the friction disk whenever the pressure is removed from the driven disk, and the slight spring of the hanger 9 will accomplish this. A spring 12ᵃ is connected to the arm 12 and to a strut-rod 12ᵇ to quickly withdraw the driven disk from the friction disk when the pawl 16 is released.

Instead of forming the hangers 9 so that they may be sprung slightly rearward I may form them as shown in detail in Fig. 4. As shown in that figure the rock shaft 8 is mounted in a pivoted section 19ᵃ of the hanger, said section being connected to the main part of the hanger by a rule-joint 19ᵇ, said rule-joint permitting the section 19ᶜ to have a slight rearward swinging movement before coming to a stop. A flat spring 19ᶜ is provided to normally throw the section 19ᵃ forward to its normal position. By this means the rearward movement of the thrust wheels will be limited, the section 19ᵃ being swung rearward to the limit of its movement by the forward pull on the arm 13 after the driven disk has been brought into contact with the friction disk. The thrust wheels are provided with a hard fiber periphery 28 which are adapted to bear against the friction disk; and with long outward extending hubs 29 to give said wheels a broad bearing support.

The rear end of the engine shaft is supported in a suitable bearing 30 supported by the cross-bar 24 of the frame.

From the foregoing the objects and advantages of the invention will be readily understood.

Having thus described my invention, what I claim as new and desire to secure by Letters Patent, is:—

1. A friction driving mechanism comprising a friction disk, a driven friction disk, a rock-shaft, means for moving said shaft, means connected to said shaft for bringing the driven disk into engagement with the friction disk, a pair of thrust wheels, means connecting said wheels to the rock-shaft whereby said thrust wheels will be brought into engagement with the friction disk on the opposite side thereof from the driven disk, and a stop device to limit the pressure of the thrust wheels on the friction disk without limiting the pressure of the driven disk on said friction disk.

2. A friction driving mechanism comprising a friction disk, a driven disk adapted to be brought into engagement with the friction disk, a thrust device normally out of engagement with the friction disk, and means for bringing said thrust device into engagement with the friction disk on the opposite side from the driven disk, a stop other than the friction disk to prevent further bodily movement of the thrust device after its contact with the friction disk.

3. A friction driving mechanism comprising a friction disk, a driven friction disk, a rock-shaft, means connecting said rock-shaft to the driven disk whereby said disk may be brought into engagement with the friction disk, a thrust wheel, means connecting said thrust wheel to the rock-shaft whereby said wheel may be brought into engagement with the friction disk, means for rotating said rock-shaft, a yielding device to permit the thrust wheels to be brought against the friction disk after the driven disk is in engagement therewith, means for limiting the pressure of the thrust wheels on the friction disk without limiting the pressure of the driven disk against the friction disk.

4. A friction driving mechanism comprising a friction disk, a driven disk, a pair of thrust wheels, provided with a non-metallic frictional surface adapted to be brought into engagement with the friction disk, the thrust wheels and the driven disk being on opposite sides of the friction disk, and means for bringing the driven disk and the thrust wheels into engagement with the friction disk, and a stop device other than the friction disk to limit the pressure of the thrust wheels on the friction disk.

5. A friction driving mechanism comprising a friction disk, a driven disk, a rock shaft, means for moving said shaft, means connected to said shaft for bringing the driven disk into engagement with the friction disk, a pair of thrust wheels, means connecting said thrust wheels to the rock shaft whereby said thrust wheels will be brought into engagement with the friction disk on the opposite side thereof from the driven disk.

6. A friction driving mechanism comprising a friction disk, a driven disk, a rock shaft, means connecting said rock shaft to the driven disk, whereby said disk may be brought into engagement with the friction disk, a pair of pivoted yokes, a thrust wheel mounted in each yoke, means connecting said yokes to the rock shaft, and means for moving said rock shaft.

7. A friction driving mechanism comprising a friction disk, a driven disk, swinging bearings for said driven disk, a thrust wheel, swinging bearings for said thrust wheel, and means for moving the driven disk and the thrust wheel into engagement with the friction disk on opposite sides thereof.

8. A friction driving mechanism comprising a friction disk, a driven disk adapted to be brought into engagement with one face of the friction disk, a thrust device normally out of engagement with the friction disk on the opposite side thereof from the driven disk, means for moving the driven disk into engagement with the friction disk and means for bringing the thrust device into engagement with the friction disk after the driven disk has been brought into engagement with the friction disk.

9. A friction driving mechanism comprising a friction disk, a driven disk, a rock-shaft, means connecting said rock-shaft to the driven disk whereby said disk may be brought into engagement with the friction disk, a thrust wheel, a swinging bearing for said wheel, means connecting said bearing to the rock-shaft, means for rotating said rock-shaft to bring the driven disk against the friction disk, and means whereby the thrust wheel may be brought against the friction disk after the driven disk is in engagement therewith.

10. A friction driving mechanism comprising a friction disk, a driven disk, means for permitting the driven disk to have a lateral bodily movement to bring said disk into and out of engagement with the friction disk, a thrust wheel provided with a non-metallic frictional surface adapted to be brought into engagement with the friction disk on the opposite side from the driven disk, and means for moving the thrust wheel and the driven disk into engagement with the friction disk.

11. A friction driving mechanism comprising a friction disk, a driven friction disk adapted to be brought into engagement with the face of the friction disk, a freely rotatable thrust wheel adapted to engage the opposite face of the friction disk, and a single instrumentality adapted to be manually operated to bring the driven disk into engagement with said friction disk and the thrust wheel into engagement with said friction disk on the opposite side thereof from the driven disk.

In testimony whereof I hereunto affix my signature in the presence of two witnesses this 10 day of December, 1906.

JOHN W. LAMBERT.

Witnesses:
 WM. R. DAVIS,
 E. H. KAUFMANN.